US008442003B2

(12) United States Patent
Stamoulis et al.

(10) Patent No.: US 8,442,003 B2
(45) Date of Patent: May 14, 2013

(54) ROUTING IN A MESH NETWORK

(75) Inventors: Anastasios Stamoulis, San Diego, CA (US); Ashwin Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 780 days.

(21) Appl. No.: 11/851,280

(22) Filed: Sep. 6, 2007

(65) Prior Publication Data

US 2009/0067369 A1 Mar. 12, 2009

(51) Int. Cl.
*H04W 36/00* (2009.01)
*H04W 36/34* (2009.01)

(52) U.S. Cl.
USPC .......................... 370/331; 370/338; 455/436

(58) Field of Classification Search ........................ None
See application file for complete search history.

(56) References Cited

U.S. PATENT DOCUMENTS

| | | | |
|---|---|---|---|
| 5,978,679 A * | 11/1999 | Agre ............................. 455/442 |
| 7,003,311 B2 | 2/2006 | Ebata et al. |
| 7,123,580 B2 | 10/2006 | Tang et al. |
| 7,460,465 B2 | 12/2008 | Bolinth et al. |
| 7,599,343 B2 * | 10/2009 | Kim et al. ...................... 370/338 |
| 2004/0066759 A1* | 4/2004 | Molteni et al. ................ 370/329 |
| 2005/0027021 A1 | 2/2005 | Espinoza et al. |
| 2005/0099978 A1* | 5/2005 | Chandra et al. ............... 370/338 |
| 2005/0135310 A1* | 6/2005 | Cromer et al. ................ 370/331 |
| 2005/0135316 A1* | 6/2005 | Cromer et al. ................ 370/338 |
| 2005/0271021 A1* | 12/2005 | Alemany et al. .............. 370/338 |
| 2006/0223574 A1* | 10/2006 | Chandra ..................... 455/552.1 |
| 2006/0256805 A1* | 11/2006 | Cho et al. ....................... 370/431 |
| 2007/0010271 A1* | 1/2007 | Roy .............................. 455/517 |
| 2007/0060064 A1* | 3/2007 | Srikrishna et al. ......... 455/67.11 |
| 2007/0076754 A1* | 4/2007 | Krishnaswamy ............. 370/468 |
| 2007/0091864 A1* | 4/2007 | Honjo et al. .................. 370/338 |
| 2007/0168326 A1* | 7/2007 | Das et al. .......................... 707/2 |
| 2007/0217377 A1* | 9/2007 | Takeuchi ...................... 370/338 |
| 2007/0263572 A1* | 11/2007 | Ren et al. ...................... 370/338 |
| 2008/0069068 A1* | 3/2008 | Dean et al. .................... 370/342 |

FOREIGN PATENT DOCUMENTS

| | | |
|---|---|---|
| CN | 101006703 A | 7/2007 |
| EP | 1895732 A1 | 3/2008 |
| JP | 2001054165 A | 2/2001 |

(Continued)

OTHER PUBLICATIONS

International Search Report, PCT/US2008/075142, International Search Authority, European Patent Office, Dec. 12, 2008.

(Continued)

*Primary Examiner* — Robert Scheibel
(74) *Attorney, Agent, or Firm* — Dang M. Vo

(57) ABSTRACT

Apparatus and method for associating with any one of a plurality of access points in a mesh network including estimating a plurality of metrics for the access points, the estimated metrics being related to throughputs provided by the access points, and selecting one of the access points to associate with based on the metrics and a plurality of backhaul metrics for the access points, the backhaul metrics being related to backhaul throughputs for the access points. The backhaul metrics may be advertised by the access points.

55 Claims, 5 Drawing Sheets

FOREIGN PATENT DOCUMENTS

| | | |
|---|---|---|
| JP | 2007096917 A | 4/2007 |
| JP | 2007510358 A | 4/2007 |
| JP | 2007165980 A | 6/2007 |
| JP | 2008547266 A | 12/2008 |
| KR | 20080020700 A | 3/2008 |
| KR | 20080025070 A | 3/2008 |
| TW | 200711500 | 3/2007 |
| WO | WO2005046267 A1 | 5/2005 |
| WO | 2006138122 | 12/2006 |

OTHER PUBLICATIONS

Written Opinion, PCT/US2008/075142, International Search Authority, European Patent Office, Dec. 12, 2008.
European Search Report—EP08006477, Search Authority—The Hague, Dec. 5, 2008.
European Search Report—EP11176963—Search Authority—The Hague-Aug. 22, 2011.
Taiwan Search Report—TW097134272—TIPO—Jun. 5, 2012.

* cited by examiner

ROUTING IN A MESH NETWORK

BACKGROUND

1. Field

The present disclosure relates generally to wireless communications, and more specifically to various techniques for routing in a mesh network.

2. Background

In wireless communication systems, access networks are generally employed to connect any number of access terminals to a wide area network (WAN), such as the Internet or a Public Switched Telephone Network (PSTN). These access networks are typically implemented with multiple wireless access points dispersed throughout a geographic region. Each of these access points provides a wired backhaul connection to the WAN. One common example is a cellular network that provides voice, data, and signaling between mobile access terminals and broadband Internet access. These cellular networks generally provide coverage over multiple cellular regions, with a fixed-site access point located in each cell to serve mobile access terminals.

A mesh network differs from this traditional approach in that any number of access points may join together to provide backhaul services to mobile access terminals. The principle is similar to the way data is routed through the Internet. Basically, the data in the mesh network is routed from one access point to another until it reaches is destination. The throughput of the mesh network will depend on the routes established by the access points to forward data.

When an access terminal uses an access network to connect to the Internet, or some other WWAN, it generally attempts to associate with an access point that will provide it with the highest throughput. In cellular networks, the process of selecting an access point to associate with is typically based on geometry (i.e., the closest access point). With this approach, the primary ambiguity in the throughput is based on the number and geometries of other access terminals being served by the same access point. Adhoc deployment of the mesh network may further contribute to the ambiguity in throughput for the access terminal that associates with an access point based on geometry.

Accordingly, there is a need in the art to improve the processes used by an access terminal to associate with an access point in a mesh network.

SUMMARY

In one aspect of the disclosure, a method of associating with any one of a plurality of access points in a mesh network includes estimating a plurality of metrics for the access points, the estimated metrics being related to throughputs provided by the access points, and selecting one of the access points to associate with based on the metrics and a plurality of backhaul metrics for the access points, the backhaul metrics being related to backhaul throughputs for the access points.

In another aspect of the disclosure, a method of advertising a backhaul metric in a mesh network includes estimating a backhaul metric related to a throughput through a backhaul of the mesh network, and advertising the backhaul metric within the mesh network.

In yet another aspect of the disclosure, an apparatus for wireless communications in a mesh network having a plurality of access points includes a processing system configured to estimate a plurality of metrics for the access points, the estimated metrics being related to throughputs provided by the access points, the processing system being further configured to select one of the access points to associate with based on the metrics and a plurality of backhaul metrics for the access points, the backhaul metrics being related to backhaul throughputs for the access points.

In a further aspect of the disclosure, an apparatus for supporting a backhaul through a mesh network includes a processing system configured to estimate a backhaul metric related to a throughput through the backhaul, and advertise the backhaul metric within the mesh network.

In yet a further aspect of the disclosure, an apparatus for wireless communications in a mesh network having a plurality of access points includes means for estimating a plurality of metrics for the access points, the estimated metrics being related to throughputs provided by the access points, and means for selecting one of the access points to associate with based on the metrics and a plurality of backhaul metrics for the access points, the backhaul metrics being related to backhaul throughputs for the access points.

In another aspect of the disclosure, an apparatus for supporting a backhaul through a mesh network includes means for estimating a backhaul metric related to a throughput through a backhaul of the mesh network, and means for advertising the backhaul metric within the mesh network.

In yet another aspect of the disclosure, a computer-program product for wireless communications includes a machine-readable medium having instructions executable by a processing system to estimate a plurality of metrics for the access points, the estimated metrics being related to throughputs provided by the access points, and select one of the access points to associate with based on the metrics and a plurality of backhaul metrics for the access points, the backhaul metrics being related to backhaul throughputs for the access points In a further aspect of the disclosure, a computer-program product for wireless communications includes a machine-readable medium having instructions executable by a processing system to estimate a backhaul metric related to a throughput through a backhaul of the mesh network, and advertise the backhaul metric within the mesh network.

In yet a further aspect of the disclosure, an access terminal for wireless communications in a mesh network having a plurality of access points includes a processing system configured to estimate a plurality of metrics for the access points, the estimated metrics being related to throughputs provided by the access points, the processing system being further configured to select one of the access points to associate with based on the metrics and a plurality of backhaul metrics for the access points, the backhaul metrics being related to backhaul throughputs for the access points, and wherein the processing is further configured to associate with the selected one on the access points, and a user interface configured to enable a user to control communications between the processing system and the selected one of the access points.

In another aspect of the disclosure, an access point includes a network adapter configured to support a backhaul through a mesh network, and a processing system configured to estimate a backhaul metric related to a throughput through the backhaul, and advertise the backhaul metric within the mesh network.

It is understood that other aspects of the invention will become readily apparent to those skilled in the art from the following detailed description, wherein various aspects of the invention are shown and described by way of illustration. As will be realized, the invention is capable of other and different configurations and implementations and its several details are capable of modification in various other respects, all without departing from the scope of this disclosure. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various configurations of the invention and is not intended to represent the only configurations in which the invention may be practiced. The detailed description includes specific details for the purpose of providing a thorough understanding of the invention. However, it will be apparent to those skilled in the art that the invention may be practiced without these specific details. In some instances, well-known structures and components are shown in block diagram form in order to avoid obscuring the concepts of the invention.

Figure 1:
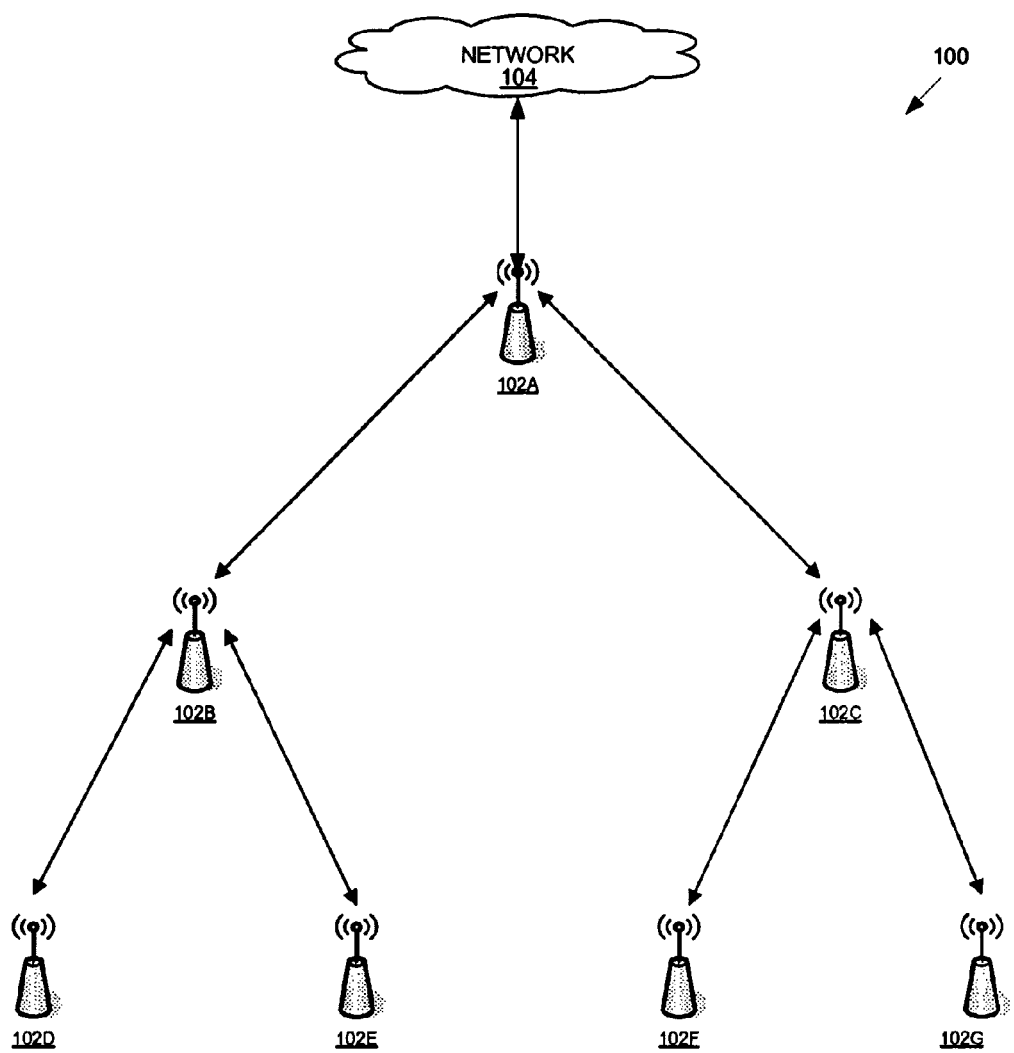
FIG. 1 is a conceptual diagram illustrating an example of a mesh network.

FIG. 1 is a conceptual diagram illustrating an example of a mesh network 100. The mesh network 100 is shown with a cluster of mesh access points (MAPs) 102 that function together to provide backhaul services to one or more access terminals (not shown). The mesh network 100 includes a wireless node 102A that provides a wired backhaul connection to a network 104 (e.g., the Internet, a cellular network, etc.). Because of its wired backhaul connection, this wireless node 102A is sometimes referred to as a root access point (RAP) for the cluster. However, this wireless node 102A may also function with other access points in a different cluster with a different RAP to provide backhaul services to access terminals.

The cluster in FIG. 1 is created by establishing radio links between the MAPs 102A-102G. In the example shown in FIG. 1, the RAP 102A has radio links with MAPs 102B and 102C, the MAP 102B also has radio links with MAPs 102D and 102E, and the MAP 102C also has radio links with the MAP 102F and MAP 102G. Although not shown, one or more of the MAPs 102B-102G may have additional radio links with other MAPs in the same cluster and/or with wireless nodes in other clusters. Moreover, one or more MAPs 102B-102G may also serve as a RAP for other wireless nodes in one or more other clusters.

The air interface specification used or adopted to support the mesh network 100 may be based on any wireless technology that enables mobile access terminals to share the available radio resources. Examples of such wireless technologies include Code Division Multiple Access (CDMA), Wideband CDMA (W-CDMA), Orthogonal Frequency Division Multiple Access (OFDMA), Time Division Multiple Access (TDMA), Frequency Division Multiple Access (FDMA), or some combination thereof. The air interface specification used to support the radio links may be CDMA2000, Evolution-Data Optimized (EV-DO), Ultra Mobile Broadband (UMB), IEEE 802.11, or any other suitable air interface specification now known or developed in the future.

Figure 2:
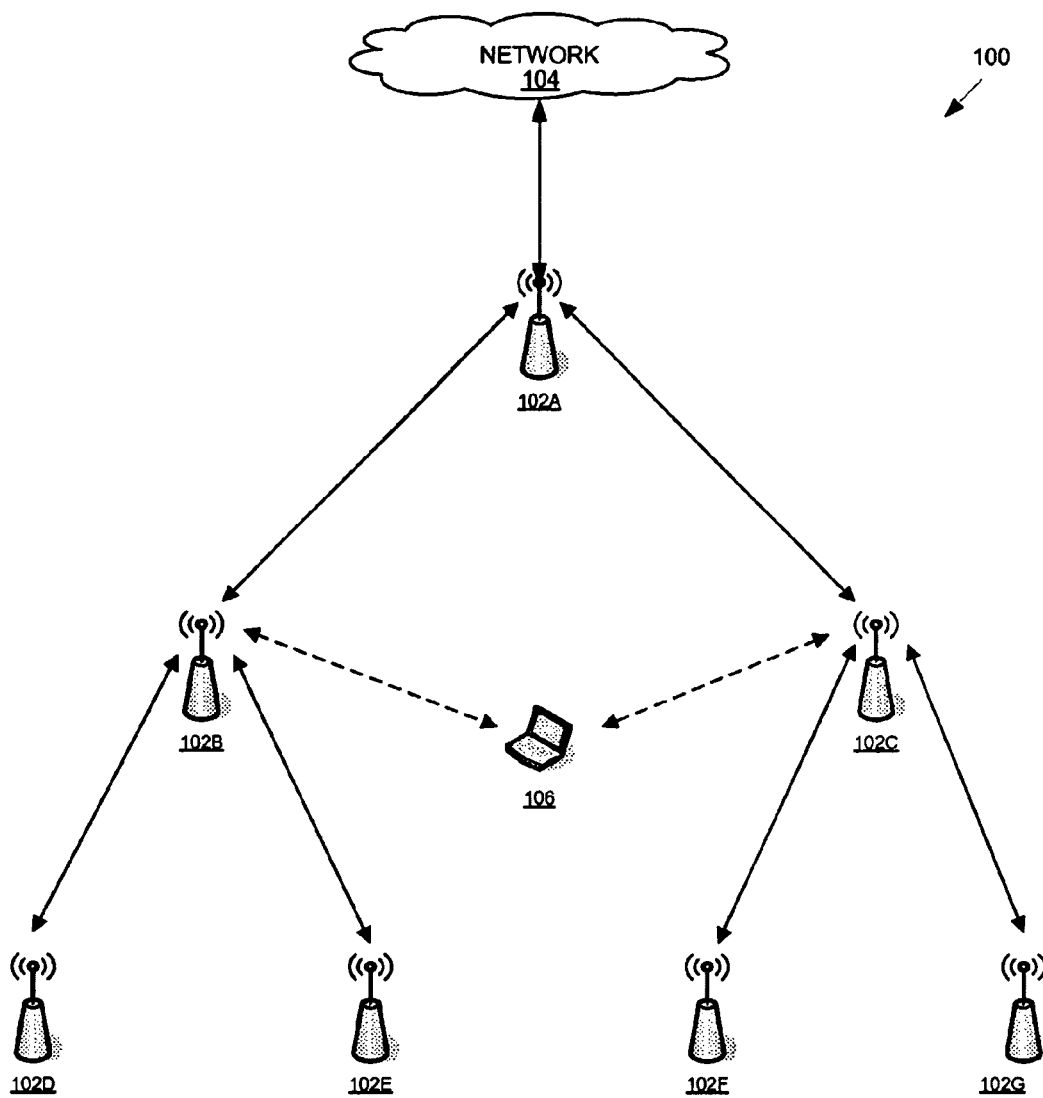
FIG. 2 is a conceptual diagram illustrating an example of an access terminal attempting to associate with a mesh network.

FIG. 2 is a conceptual diagram illustrating an example of an access terminal 106 attempting to associate with a mesh network 100. The access terminal 106 may be any mobile user device capable of supporting radio communications with a wireless node 102 including, by way of example, a mobile or cellular phone, a personal digital assistant (PDA), a laptop computer, a digital audio device (e.g., an MP3 player), a game console, a digital camera, or other voice, data, audio, video, messaging, or multimedia device. In some applications, the access terminal 106 may also function as an access point for other wireless nodes in the same or different cluster of the mesh network 100.

When the access terminal 106 attempts to associate with the mesh network 100, it determines how it should forward data to the RAP 102A. In this example, the access terminal 106 will likely establish a route through one of two MAPs 102B or 102C. A number of possible association techniques may be used by the access terminal 106 to select the MAP that can provide the highest throughput. These techniques are also applicable to other wireless nodes that attempt to join the mesh network 100 such as a MAP that was previously off line and now is ready to become part of the mesh network.

One association technique is based on the certain metrics for each of the two MAPs 102B and 102C. Specifically, for each MAP 102B and 102C, the access terminal 106 estimates a metric related to the throughput that the MAP can provide. The access terminal 106 also obtains a backhaul metric for each MAP 102B and 102C related to the throughput that the backhaul for that MAP can provide. The backhaul metrics may be advertised by the MAPs 102B and 102C, or the access terminal 106 may obtain them in another way. The access terminal 106 then selects one of the two MAPs 102B and 102C based on the metrics and the backhaul metrics.

An example will now be presented with the metrics comprising the geometries of the MAPs 102 in the mesh network. Referring to FIG. 2, the access terminal 106 determines the geometry for the MAPs 102B and 102C. The geometry for a MAP may be determined, for example, by the signal strength of its beacon. The beacons may be transmitted from each MAP in a way to avoid collisions. This may be accomplished by separating the beacons in time, using GPS synchronization, and having the MAPs transmit their beacons with appropriate offsets inside a beacon frame. Alternatively, the beacons may be transmitted on different frequencies. In any event, once the geometries of the MAPs 102B and 102C are known, the access terminal 106 can then determine the throughput it can achieve through each.

Next, the access terminal 106 obtains the backhaul geometry for each of the MAPs 102B and 102C. The backhaul geometry may be determined by measuring the signal strength of the beacon transmitted by the RAP 102A at both the MAPs 102B and 102C. The backhaul geometry for each MAP 102B and 102C may then be advertised in its respective beacon, or it can be transmitted by each MAP 102B and 102C in response to a probe message from the access terminal 106. Once the backhaul geometries for the MAPs 102B and 102C are obtained, the access terminal 106 can then determine the throughput that can be achieved through the backhaul for each.

The process of selecting a MAP to associate with is a two step process. First, the access terminal 106 estimates the overall throughput it will achieve through each of the MAPs 102B and 102C by taking the minimum of (1) the throughput to the MAP (as determined from the estimated geometry) and (2) the throughput that the MAP receives from its own connection to the RAP 102A (as determined from the backhaul geometry). Second, the access terminal 106 selects the MAP that provides the maximum overall, throughput.

The example just presented is well suited for a mesh network 100 that is unloaded or slightly loaded. In a mesh network 100 that is loaded, an access terminal 106, or other wireless node, may attempt to associate with a MAP that provides it with the highest throughput while the MAP adheres to its scheduling policy. In the following example, it is assumed that all MAPs adopt the same scheduling policy, such as an equal grade of service (EGOS) policy, although one skilled in the art will be readily able to extend the principles presented in this example to any suitable scheduling policy. In this example, each MAP advertises its rate based on its scheduling policy and its backhaul geometry. Based on this advertisement, and its own estimated geometries, the access terminal 106 can figure out what overall throughput it will receive by associating with any particular MAP. After the access terminal 106 associates with a MAP, the MAP adjusts accordingly the rates it provides to all wireless nodes that are associated with the MAP.

Various other metrics may be used by the access terminal 106 to associate with a MAP 102 in the mesh network 100 to maximize throughput. By way of example, the access terminal 106 may use the channel gain in the mesh network 100 to select the appropriate MAP to associate with. Referring to FIG. 2, the access terminal 106 determines the channel gain that can be provided by each MAP 102B and 102C. The access terminal 106 also receives, either in a beacon or in response to a probe message, the channel gain that can be provided by the backhaul for each MAPs 102B and 102C (i.e., channel gain between the MAP 102 and the RAP 102A). These metrics may then be used to compute the overall throughput provided by each MAP 102B and 102C and select the appropriate MAP 102 to associate with in a manner similar to that presented earlier in connection with the geometry based selection.

As an alternative to channel gains, the access terminal 106 may use rates to select the appropriate MAP 102 to associate with. In this example, the access terminal 106 determines the rate that can be provided by various MAPs within its vicinity and the backhaul rate that can be supported by each. These metrics are then used to compute the overall throughput provided by each MAP to support the selection of the MAP 102 to associate with.

The examples presented thus far are directed to routing schemes with a single hop between the RAP and the MAP. However, depending on the configuration of the mesh network, the loading on the mesh network, and the channel conditions, an access terminal may select a path with multiple hops between the RAP and a MAP associated with the access terminal.

Figure 3:
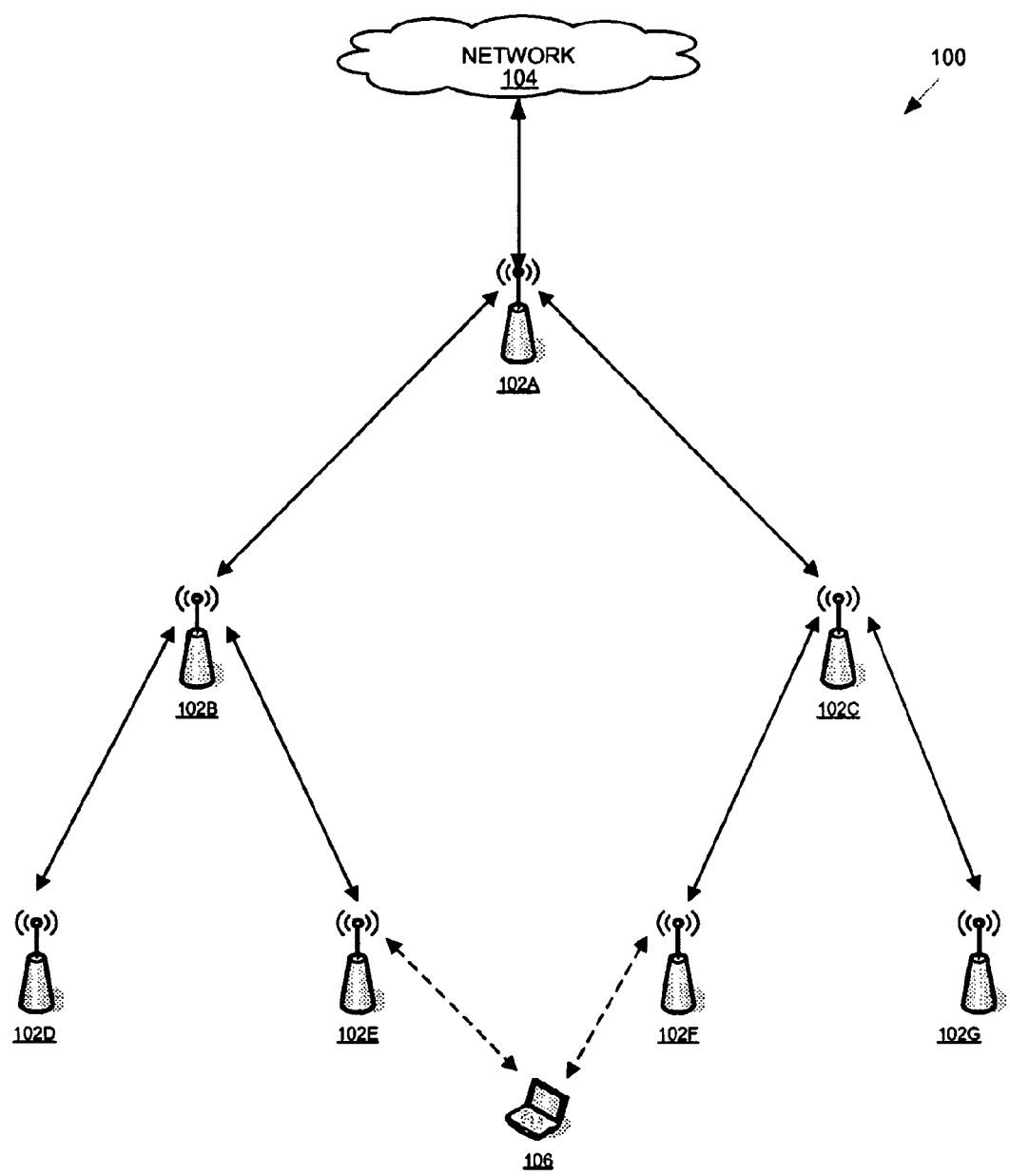
FIG. 3 is a conceptual diagram illustrating another example of an access terminal attempting to associate with a mesh network.

FIG. 3 is a conceptual diagram illustrating another example of an access terminal 106 attempting to associate with a mesh network 100. In this example, there are two MAPs 102E and 102F that the access terminal 106 is likely to associate with, and each of these MAPs 102E and 102F have a backhaul to the RAP 102A. The first MAP 102E has a backhaul to the RAP 102A through MAP 102B and the second MAP 102F has a backhaul to the RAP 102A through MAP 102C.

When the access terminal 106 attempts to associate with the mesh network 100, it determines a metric for each MAP 102E and 102F (e.g., geometry, channel gain, rate, etc.). Next, the access terminal 106 receives an advertisement from each MAP 102E and 102F, or otherwise obtains, a backhaul metric for each. The backhaul metric comprises a vector that contains a metrics for each hop through the backhaul of the mesh network 100. By way of example, the access terminal 106 may obtain a vector from the MAP 102E that contains a first metric for the hop between the MAP 102E and an intermediate MAP 102B and a second metric for the hop between the intermediate MAP 102B and the RAP 102A. The access terminal 106 then determines the throughput for each of the three hops to the RAP 102 and assigns the minimum throughput as the overall throughput supported by the MAP 102E through the mesh network. In a similar fashion, the access terminal 106 determines the overall throughput supported by the MAP 102F and then selects the MAP with the maximum overall throughput to associate with.

Figure 4:
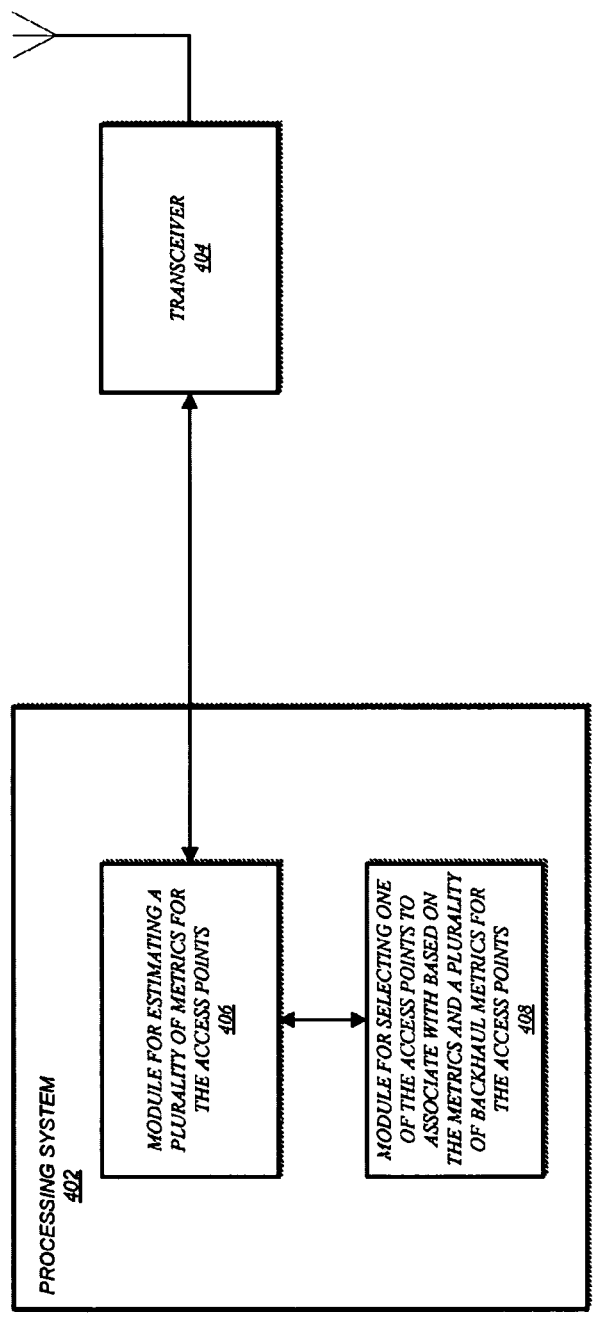
FIG. 4 is a block diagram illustrating an example of the functionality of an access terminal.

FIG. 4 is a block diagram illustrating an example of the functionality of an access terminal 106. The access terminal 106 is shown with a processing system 402 and a transceiver 404. The transceiver 404 may be used to implement the analog portion of the physical layer and the processing system 402 may be used to implement the digital processing portion of the physical layer, as well as the link layer. The processing system 402 may also be used to perform various other functions, including the process of associating with an access point in the mesh network. Specifically, the processing system 402 may provide a module 406 for estimating a plurality of metrics for the access points. These metrics may be related to the throughputs provided by the access points. The processing system 402 may also provide a module 408 for selecting one of the access points to associate with based on the metrics and a plurality of backhaul metrics for the access points. The backhaul metrics may be related to backhaul throughputs for the access points.

Figure 5:
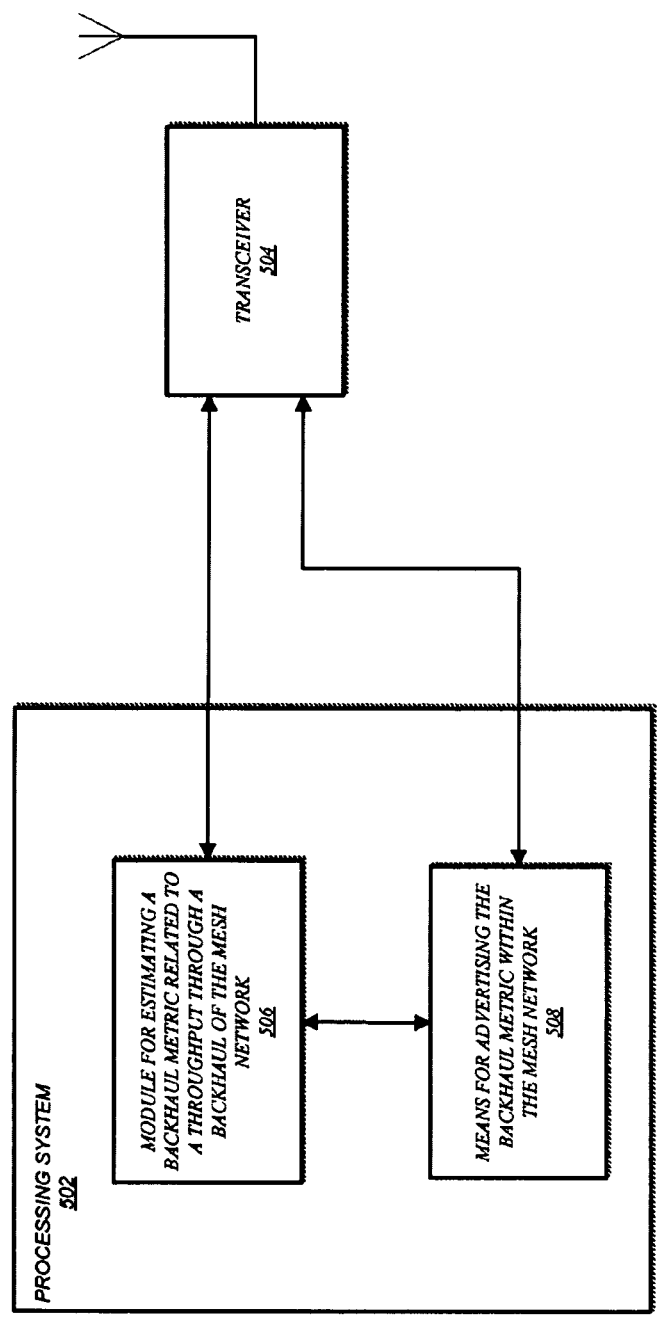
FIG. 5 is a block diagram illustrating an example of the functionality of an access point.

FIG. 5 is a block diagram illustrating an example of the functionality of an access point 102. The access point 102 is shown with a processing system 502 and a transceiver 504. Much like the access terminal discussed earlier in connection with FIG. 4, the transceiver 504 may be used to implement the analog portion of the physical layer and the processing system 502 may be used to implement the digital processing portion of the physical layer, as well as the link layer. The processing system 502 may also be used to perform various other functions, including the process of enabling an access terminal, or other wireless node, to associate with it to join the mesh network. Specifically, the processing system 502 may provide a module 506 for estimating a backhaul metric related to the throughput through a backhaul of the mesh network. The processing system 502 may also include a module 508 for advertising the backhaul metric within the mesh network.

The processing systems 402 and 502 described in connection with FIGS. 4 and 5 may be implemented using software, hardware, or a combination of both. By way of example, a processing system may be implemented with one or more integrated circuits (IC). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the general purpose processor may be any conventional processor, controller, microcontroller, or state machine. A processing system may also be implemented as a combination of computing devices, e.g., a combination of a DSP and a microprocessor, a plurality of microprocessors, one or more microprocessors in conjunction with a DSP core, or any other such configuration.

The code or instructions may be embodied in one or more machine-readable media to support software applications. Software shall be construed broadly to mean instructions, programs, code, or any other electronic media content whether referred to as software, firmware, middleware, microcode, hardware description language, or otherwise. Machine-readable media may include storage integrated with a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system. Moreover, in some aspects any suitable computer-program product may comprise a computer-readable medium or machine-readable medium comprising codes relating to one or more of the aspects of the disclosure. In some aspects a computer program product may comprise packaging materials.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of associating with any one of a plurality of access points in a mesh network, comprising:
   estimating, by an apparatus, a plurality of metrics for the access points, the estimated metrics being related to throughputs provided by the access points;
   receiving, by the apparatus, a plurality of backhaul metrics for the access points, the backhaul metrics being related to backhaul throughputs for the access points;
   receiving, by the apparatus, a plurality of rates for the access points, wherein each rate is based on a scheduling policy of the respective access point; and
   selecting, by the apparatus, one of the access points to associate with based on the metrics, backhaul metrics and rates for the access points.

2. The method of claim 1 wherein said one of the access points is selected to provide a highest throughput through the mesh network based on the metrics, the backhaul metrics, and the rates.

3. The method of claim 1 further comprising maintaining a list of access points, and wherein said one of the access points is selected from the list based on the metrics, the backhaul metrics, and the rates.

4. The method of claim 3 further comprising receiving the list in an over the air transmission.

5. The method of claim 1 wherein the metrics comprise geometries of the access points, and the backhaul metrics comprise backhaul geometries for the access points.

6. The method of claim 1 wherein the metrics comprise channel gains provided by the access points, and the backhaul metrics comprise backhaul channel gains for the access points.

7. The method of claim 1 wherein the metrics comprise rates provided by the access points, and the backhaul metrics comprise backhaul rates for the access points.

8. The method of claim 1 further comprising receiving the backhaul metrics from the access points, wherein the backhaul metrics are received in the beacon signals from the access points.

9. The method of claim 1 wherein the beacon signals received from each access point are separated in time using GPS synchronization based on one or more offsets in a beacon frame.

10. The method of claim 8 further comprising transmitting probe messages to the access points, and wherein the backhaul metrics are received from the access points in response to the probe messages.

11. A method of advertising a backhaul metric in a mesh network, comprising:
    receiving a beacon signal from an access point;
    measuring a signal strength of the received beacon signal;
    estimating a backhaul geometry based on the signal strength of the beacon signal;
    estimating a rate based on a scheduling policy; and
    advertising the rate and a backhaul metric within the mesh network, wherein the backhaul metric comprises the backhaul geometry.

12. The method of claim 11 further comprising transmitting a second beacon signal, and wherein the backhaul metric is advertised in the second beacon signal.

13. The method of claim 11 further comprising receiving a probe message from a wireless node, and wherein the backhaul metric is advertised to the wireless node in response to the probe message.

14. The method of claim 11 further comprising supporting an additional wireless node and updating the advertised rate based on the support of the additional wireless node.

15. The method of claim 11 wherein the backhaul metric comprises a channel gain provided by the backhaul.

16. The method of claim 11 wherein the backhaul geometry is estimated based on the signal strength of each of a plurality of beacon signals and by separating the beacon signals in time using GPS synchronization based on one or more offsets in a beacon frame.

17. The method of claim 11, wherein the scheduling policy comprises an equal grade of service policy.

18. An apparatus for wireless communications in a mesh network having a plurality of access points, comprising:
    a transceiver; and
    a processing system configured to:
        estimate a plurality of metrics for the access points, the estimated metrics being related to throughputs provided by the access points,
        receive, via the transceiver, a plurality of backhaul metrics for the access points, the backhaul metrics being related to backhaul throughputs for the access points, receive, via the transceiver, a plurality of rates for the access points, wherein each rate is based on a scheduling policy of the respective access point, and select one of the access points to associate with based on the metrics, backhaul metrics and rates for the access points.

19. The apparatus of claim 18 wherein the processing system is further configured to select said one of the access points to provide a highest throughput through the mesh network based on the metrics, the backhaul metrics, and the rates.

20. The apparatus of claim 18 wherein the processing system is further configured to maintain a list of access points, the processing system being further configured to select said one of the access points based on the metrics, the backhaul metrics, and the rates.

21. The apparatus of claim 20 wherein the processing system is further configured to receive the list in an over the air transmission.

22. The apparatus of claim 20 wherein the processing system is provisioned with the list.

23. The apparatus of claim 18 wherein the metrics comprise geometries of the access points, and the backhaul metrics comprise backhaul geometries for the access points.

24. The apparatus of claim 18 wherein the metrics comprise channel gains provided by the access points, and the backhaul metrics comprise backhaul channel gains for the access points.

25. The apparatus of claim 18 wherein the metrics comprise rates provided by the access points, and the backhaul metrics comprise backhaul rates for the access points.

26. The apparatus of claim 18 wherein the processing system is further configured to receive the backhaul metrics from the access points, and wherein the backhaul metrics are received in the beacon signals from the access points.

27. The apparatus of claim 18 wherein the beacon signals received from each access point are separated in time using GPS synchronization based on one or more offsets in a beacon frame.

28. The apparatus of claim 26 wherein the processing system is further configured to transmit probe messages to the access points, and wherein the processing system is further configured to receive the backhaul metrics from the access points in response to the probe messages.

29. An apparatus for supporting a backhaul through a mesh network, comprising:
 a transceiver; and
 a processing system configured to:
  receive, via the transceiver, a beacon signal from an access point,
  measure a signal strength of the received beacon signal,
  estimate a backhaul geometry based on the signal strength of the beacon signal,
  estimate a rate based on a scheduling policy, and
  advertise the rate and a backhaul metric within the mesh network, wherein the backhaul metric comprises the backhaul geometry.

30. The apparatus of claim 29 wherein the processing system is further configured to support a transmission of a second beacon signal, and wherein the backhaul metric is advertised in the second beacon signal.

31. The apparatus of claim 29 wherein the processing system is further configured to receive a probe message from a wireless node, and wherein the backhaul metric is advertised to the wireless node in response to the probe message.

32. The apparatus of claim 29 wherein the processing system is further configured to supporting an additional wireless node and update the advertised rate based on the support of the additional wireless node.

33. The apparatus of claim 29 wherein the backhaul metric comprises a channel gain provided by the backhaul.

34. The apparatus of claim 29 wherein the backhaul geometry is estimated based on the signal strength of each of a plurality of beacon signals and by separating the beacon signals in time using GPS synchronization based on one or more offsets in a beacon frame.

35. An apparatus for wireless communications in a mesh network having a plurality of access points, comprising:
 means for estimating a plurality of metrics for the access points, the estimated metrics being related to throughputs provided by the access points;
 means for receiving a plurality of backhaul metrics for the access points, the backhaul metrics being related to backhaul throughputs for the access points;
 means for receiving a plurality of rates for the access points, wherein each rate is based on a scheduling policy of the respective access point; and
 means for selecting one of the access points to associate with based on the metrics, backhaul metrics and rates for the access points.

36. The apparatus of claim 35 wherein the means for selecting one of the access points is configured to select said one of the access points to provide a highest throughput through the mesh network based on the metrics, the backhaul metrics, and the rates.

37. The apparatus of claim 35 further comprising means for maintaining a list of access points, and wherein the means for selecting one of the access points is configured to select said one of the access points from the list based on the metrics, the backhaul metrics, and the rates.

38. The apparatus of claim 37 further comprising means for receiving the list in an over the air transmission.

39. The apparatus of claim 37 further comprising means for provisioning the list.

40. The apparatus of claim 35 wherein the metrics comprise geometries of the access points, and the backhaul metrics comprise backhaul geometries for the access points.

41. The apparatus of claim 35 wherein the metrics comprise channel gains provided by the access points, and the backhaul metrics comprise backhaul channel gains for the access points.

42. The apparatus of claim 35 wherein the metrics comprise rates provided by the access points, and the backhaul metrics comprise backhaul rates for the access points.

43. The apparatus of claim 35 further comprising means for receiving the backhaul metrics from the access points, wherein the backhaul metrics are received in the beacon signals from the access points.

44. The apparatus of claim 35 wherein the beacon signals received from each access point are separated in time using GPS synchronization based on one or more offsets in a beacon frame.

45. The apparatus of claim 35 further comprising means for transmitting probe messages to the access points, and wherein the means for receiving the backhaul metrics is configured receive the backhaul metrics in response to the probe messages.

46. An apparatus for supporting a backhaul through a mesh network, comprising:
 means for receiving a beacon signal from an access point;
 means for measuring a signal strength of the received beacon signal;

means for estimating a backhaul geometry based on the signal strength of the beacon signal;

means for estimating a rate based on a scheduling policy; and means for advertising the rate and a backhaul metric within the mesh network, wherein the backhaul metric comprises the backhaul geometry.

47. The apparatus of claim 46 further comprising means for transmitting a second beacon signal, and wherein the means for advertising the backhaul metric is configured to advertise the backhaul metric in the second beacon signal.

48. The apparatus of claim 46 further comprising means for receiving a probe message from a wireless node, and wherein the means for advertising the backhaul metric is configured to advertise the backhaul metric to the wireless node in response to the probe message.

49. The apparatus of claim 46 further comprising means for supporting an additional wireless node and means for updating the advertised rate based on the support of the additional wireless node.

50. The apparatus of claim 46 wherein the backhaul metric comprises a channel gain provided by the backhaul.

51. The apparatus of claim 46 wherein the backhaul geometry is estimated based on the signal strength of each of a plurality of beacon signals and by separating the beacon signals in time using GPS synchronization based on one or more offsets in a beacon frame.

52. A computer-program product for wireless communications comprising:
    a machine-readable storage device encoded with instructions executable by an apparatus:
    estimate a plurality of metrics for the access points, the estimated metrics being related to throughputs provided by the access points;
    receive a plurality of backhaul metrics for the access points, the backhaul metrics being related to backhaul throughputs for the access points;
    receive a plurality of rates for the access points, wherein each rate is based on a scheduling policy of the respective access point; and
    select one of the access points to associate with based on the metrics, backhaul metrics and rates for the access points.

53. A computer-program product for wireless communications comprising:
    a machine-readable storage device encoded with instructions executable by an apparatus:
    receive a beacon signal from an access point,
    measure a signal strength of the received beacon signal,
    estimate a backhaul geometry based on the signal strength of the beacon signal,
    estimate a rate based on a scheduling policy, and
    advertise the rate and a backhaul metric within the mesh network, wherein the backhaul comprises the backhaul geometry.

54. An access terminal for wireless communications in a mesh network having a plurality of access points, comprising:
    a transceiver;
    a processing system configured to:
        estimate a plurality of metrics for the access points, the estimated metrics being related to throughputs provided by the access points,
        receive, via the transceiver, a plurality of backhaul metrics for the access points, the backhaul metrics being related to backhaul throughputs for the access points,
        receive, via the transceiver, a plurality of rates for the access points, wherein each rate is based on a scheduling policy of the respective access point, and
        select one of the access points to associate with based on the metrics, backhaul metrics and rates for the access points; and
    a user interface configured to enable a user to control communications between the processing system and the selected one of the access points.

55. An access point for wireless communications, comprising:
    a network adapter configured to support a backhaul through a mesh network; and
    a processing system configured to:
        receive, via a transceiver, a beacon signal from an access point,
        measure a signal strength of the received beacon signal,
        estimate a backhaul geometry based on the signal strength of the beacon signal,
        estimate a rate based on a scheduling policy, and
        advertise the rate and a backhaul metric within the mesh network, wherein the backhaul comprises the backhaul geometry.

* * * * *